March 20, 1951 L. J. PULSE 2,545,588
DISPENSING MACHINE
Filed Aug. 2, 1949 2 Sheets-Sheet 1
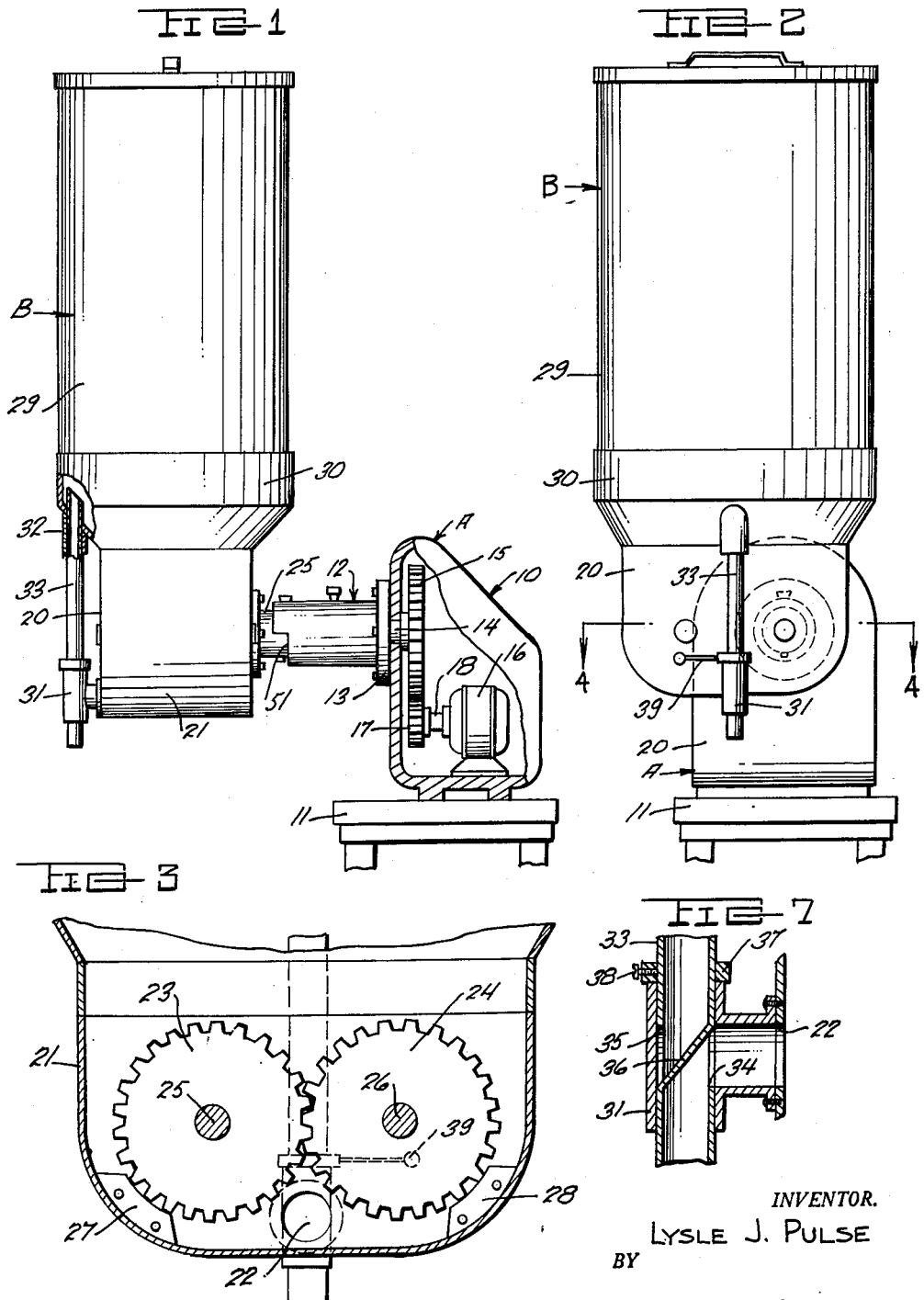
INVENTOR.
LYSLE J. PULSE
BY
McMorrow, Berman + Davidson
ATTORNEYS March 20, 1951  L. J. PULSE  2,545,588
DISPENSING MACHINE
Filed Aug. 2, 1949  2 Sheets-Sheet 2
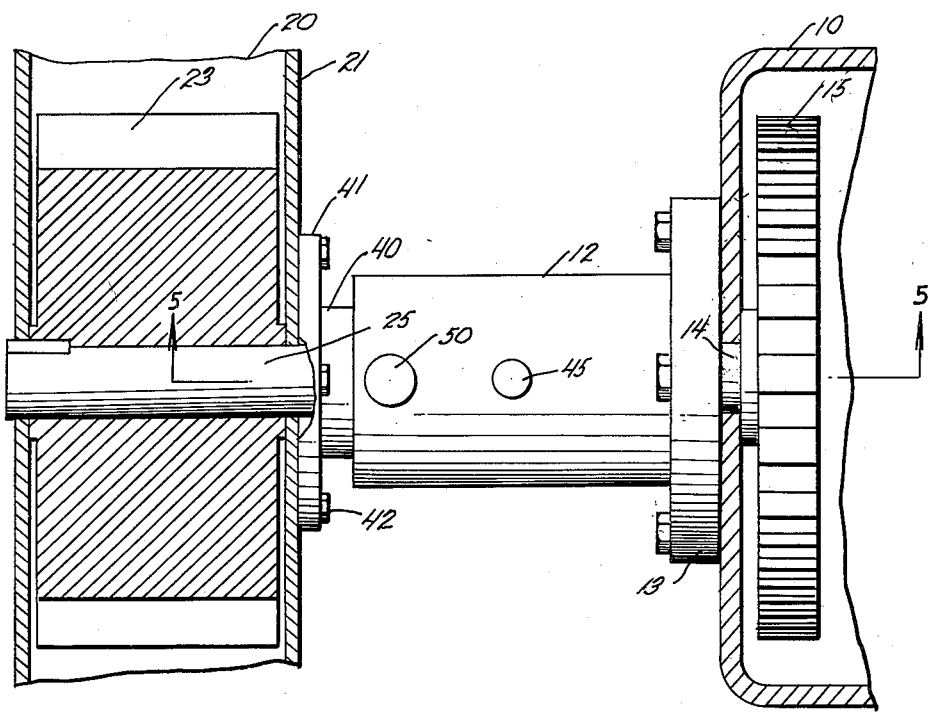
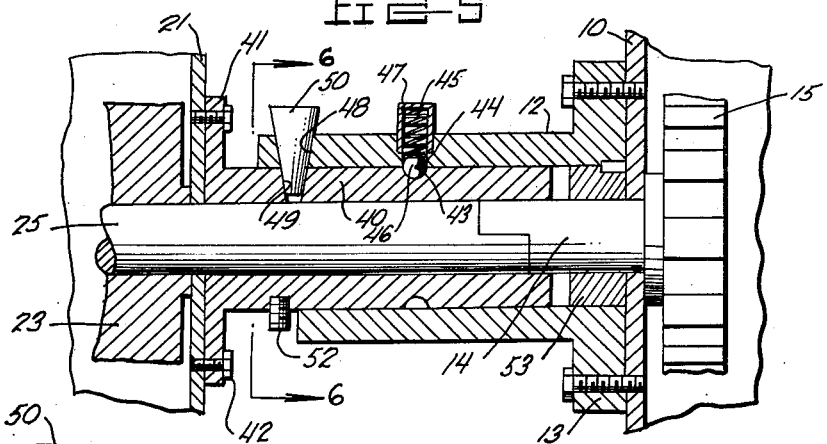
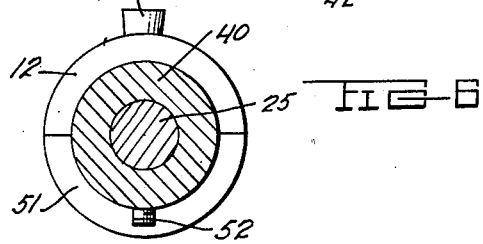
INVENTOR.
LYSLE J. PULSE
BY
McMorrow, Berman + Davidson
ATTORNEYS Patented Mar. 20, 1951

2,545,588

UNITED STATES PATENT OFFICE 2,545,588

DISPENSING MACHINE

Lysle J. Pulse, Helena, Mont.

Application August 2, 1949, Serial No. 108,127

4 Claims. (Cl. 226—19)

This invention relates to dispensing machines, and more particularly to a machine for dispensing ice cream into cartons.

It is among the objects of the invention to provide an improved dispensing machine for packaging ice cream which machine does not compress the ice cream and thereby change its texture and volume, and does not waste any of the ice cream during the packaging operation, is power operated and may be continuously operated during use, has its ice cream receiving portion removable as a unit from its power unit for convenience in cleaning and sterilizing the ice cream handling portion thereof, and has such receiving unit pivotally mounted so that the hopper can be brought to a substantially horizontal position for convenience in charging the hopper, and which machine is simple and durable in construction, economical to manufacture, easy to use, and neat and attractive in appearance.

Other objects and advantages will become apparent from a consideration of the following description and the appended claims in conjunction with the accompanying drawings, wherein:

Figure 1 is a side elevation of a dispensing machine illustrative of the invention, portions being broken away and shown in cross-section to better illustrate the construction of the machine;

Figure 2 is a front elevation of the dispensing machine;

Figure 3 is a cross-sectional view on an enlarged scale of the dispensing machine pump;

Figure 4 is a transverse cross-section on an enlarged scale of a fragmentary portion of the machine and is taken substantially on the line 4—4 of Figure 2;

Figure 5 is a cross-section on the line 5—5 of Figure 4;

Figure 6 is a transverse cross-section on the line 6—6 of Figure 5; and

Figure 7 is a cross-section of a fragmentary portion of the device showing a dispensing valve.

With continued reference to the drawings, the machine comprises a power unit as indicated at A, and an ice cream receiving unit, as indicated at B.

The power unit A comprises a hollow housing 10 rigidly mountable on a suitable horizontal or vertical supporting surface, such as the table or bench top 11, a cylindrical sleeve 12 secured at one end to the housing by suitable means, such as the sleeve flange 13 and projecting horizontally from the housing, a drive shaft 14 journaled in the sleeve 12, a spur gear 15 secured on the shaft 14 within the housing 10, a power unit 16, such as a conventional electric motor, mounted in the housing and a spur gear 17 secured on the motor shaft 18 and meshing with the gear 15 to drive the drive shaft 14. The gear 15 is preferably larger than the gear 17 to provide a speed-reducing drive between the motor and the drive shaft.

The ice cream handling unit B comprises a gear pump 20 including a pump housing 21 having an open top and an outlet opening 22 in one of its side walls, such opening being located near the bottom and substantially at the mid-width location of the pump. A pair of inter-meshing pump gears 23 and 24 are respectively mounted on parallel shafts 25 and 26 journaled in the side walls of the pump housing, and two blocks 27 and 28 in the housing 21 respectively contact the gears 23 and 24 peripherally at locations on the gears spaced from the location at which the two gears inter-mesh, so that material, such as ice cream, entering the pump housing through the open top thereof will be carried around by the gears into the space between the gears and the bottom wall of the pump housing and forced out of the pump housing through the outlet opening 22.

An elongated hopper 29, preferably of cylindrical form, is mounted on the upper end of the pump housing 21 and has an open bottom end in communication with the open top end of the pump housing. A reducing structure 30 is preferably interposed between the bottom of the hopper 29 and the top of the pump housing 21 to fare the bottom of the hopper into the top of the pump housing.

A T-fitting 31 has its stem secured in the outlet opening 21 of the pump housing and its cross portion extending substantially vertically and parallel to the adjacent side wall of the housing. An aperture is provided in the lower end of the hopper 29 or in the formation 30 outside of the pump housing 21 and this aperture is surrounded by a downwardly-extending cylindrical sleeve 32. A valve tube 33 extends through the cross of the T-fitting 31 and through the sleeve 32 and is journaled in the T-fitting and the sleeve for rotation to a limited, angular extent. Within the T-fitting the valve tube 33 is provided with two oppositely-disposed openings 34 and 35 which alternatively register with the interior of the stem portion of the T-fitting, and a partition 36 extends diagonally from the bottom of the opening 35 to the top of the opening 34. When the valve tube is in the position illustrated in Figure 7, the outlet opening 22 in the pump housing is connected through the opening 34 in the valve tube with the bottom end of the valve tube for discharge of ice cream from the pump through the valve tube into a carton placed below the valve tube. When the valve tube is rotated 180-degrees from the position illustrated in Figure 7, the opening 35 is brought into registry with the stem of the T-fitting and ice cream forced by the pump through the outlet opening 22 is then carried upwardly through the tubular valve into the interior of the hopper so that, when it is desired to discontinue dispensing of ice cream from the bottom of the valve tube, the ice cream is merely re-circulated from the hopper through the pump and back into the hopper without substantial compression.

A collar 37 is secured on the valve tube at the upper end of the cross portion of the T-fitting 31 by suitable means, such as the set screw 38, and a handle 39 projects radially outward from this collar for manually rotating the valve tube. A sleeve 40 is secured on the side wall of the pump housing opposite the side wall in which the outlet opening 22 is provided and this sleeve surrounds and provides a bearing for the pump shaft 25, which shaft is extended to extend through the sleeve outwardly of the adjacent pump side wall, and the shafts 25 and 14 are provided at their outer or adjacent ends with separable, torque-transmitting formations which are operatively inter-connected when the sleeve 40 is received in the sleeve 12, as illustrated in Figures 4 and 5. The torque-transmitting formations on the shafts 25 and 14 may comprise an internally splined well in one of the shafts and an externally splined, reduced extension on the other shaft received in the well of the first-mentioned shaft, or may comprise inter-locking tongues at the adjacent ends of the shafts, as illustrated in Figure 5.

The sleeve 40 is secured to the pump housing by suitable means, such as the sleeve flange 41 and the cap screws 42 extending through the flange and threaded into the pump housing, and this sleeve is rotatably received in the sleeve 12 in a manner to bring the shafts 14 and 25 into axial alignment with each other.

An aperture is provided in the sleeve 12 intermediate the length of the latter, and a recess 43 is provided in the sleeve 40 which recess registers with the aperture 44 in sleeve 12 when the unit B is supported by the unit A with the hopper 29 in upright position and the two shafts 14 and 25 operatively interlock. A hollow, cylindrical spring receiver 45 is secured in the aperture 44, a ball detent 46 is located in the aperture for engagement in the recess 43, and a compression spring 47 is disposed in the receiver between the ball and the closed outer end of the receiver to resiliently force the ball into the recess 43. This ball detent will resiliently retain the unit B with the hopper 29 in upright position, but its effect can be easily overcome by exerting manual force on the hopper in a lateral direction.

Registering, tapered apertures 48 and 49 are provided in the sleeves 12 and 40, respectively, and a tapered pin 50 is inserted in these apertures to releasably lock the sleeves 12 and 40 together against relative rotational movement with the hopper 29 held in upright position. When the pin 50 is manually removed, the hopper can be turned about the rotational axis of the sleeve 40 to a substantially horizontal position in either direction for convenience in charging the hopper, this movement of the hopper being accomplished by manually overcoming the resistance of the detent ball 46 to rotation of the sleeve 40 in the sleeve 12. At its outer end, the sleeve 12 is provided with a substantially semi-circular recess 51 providing diametrically opposite shoulders disposed in a substantially horizontal plane, and a stop pin 52 is threaded into the sleeve 40 in position to contact one or the other of these shoulders on the sleeve 12 to restrain the hopper against turning past a substantially horizontal position in either direction. A bearing 53 for the drive shaft 14 is provided in the sleeve 12 adjacent the outer surface of the wall of the housing 10 through which the shaft 14 extends.

In using the device, the hopper is first lowered to a substantially horizontal position and filled with ice cream and is then returned to its upright position and locked in such upright position by inserting the pin 50 in the apertures 48 and 49. The valve tube 33 is then turned to connect the T-fitting 31 with the interior of the hopper and the motor 16 is placed in operation to drive the pump 20. A carton is then placed below the valve tube 33 and this tube rotated through 180 degrees by the handle 39, so that the pump will discharge ice cream through the valve tube into the carton. When the carton has been filled, the valve tube is rotated back to the position in which it connects the pump with the interior of the hopper until another carton is placed below the valve tube, whereupon the above operation is repeated.

By re-circulating the ice cream when it is not being discharged into a carton, the pump can be maintained in continuous operation without the necessity of starting and stopping the pump and at the same time, the ice cream will not be compressed in a manner to change its volume or texture. Also, by making the unit B easily detachable from the power unit A, the entire unit B can be conveniently cleaned and sterilized whenever necessary or desirable.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A dispensing machine for dispensing ice cream comprising a power unit rigidly mounted on a fixed support and having a sleeve projecting substantially horizontally therefrom and a drive shaft concentric with said sleeve, and an ice cream handling assembly comprising a gear pump having a housing provided with an outlet opening, a sleeve projecting from said pump housing and rotatably receivable in said power unit sleeve, and a pump shaft journaled in the pump housing carried sleeve and having a separable driving connection with said power unit drive shaft, a hopper supported on said pump housing and having an opening in its lower end outside of said pump housing, a T-fitting secured in the outlet opening of said pump housing, a valve tube extending through said T-fitting and journaled in the opening in said hopper and manually rotatable between a position in which it connects the outlet opening in said pump housing with the interior of said hopper and a position in which it connects said pump housing outlet opening with the bottom end of said tube for discharging ice cream from said pump into a carton placed below said valve tube, and means releasably inter-connected between said sleeves for holding said ice cream handling assembly with said hopper in upright position.

2. A dispensing machine comprising a power unit having a drive shaft projecting therefrom, a material handling assembly including a pump having a discharge opening and a pump shaft projecting therefrom, a hopper mounted on said pump, and manually-operated valve means connected to said pump at said outlet opening and to said hopper and operative to discharge material from said pump or to return such material from said pump to said hopper, and means detachably mounting said material handling unit on said power unit with said pump shaft in axial alignment with said drive shaft, said shafts having separable, torque-transmitting connecting means thereon.

3. A dispensing machine comprising a power unit having a drive shaft projecting therefrom, a material handling assembly including a pump having a discharge opening and a pump shaft projecting therefrom, a hopper mounted on said pump, and manually-operated valve means connected to said pump at said outlet opening and to said hopper and operative to discharge material from said pump or to return such material from said pump to said hopper, and means detachably mounting said material handling unit on said power unit with said pump shaft in axial alignment with said drive shaft, said shafts having separable, torque-transmitting connecting means thereon, said valve means comprising a hollow T-fitting having its stem secured in said pump outlet opening, a tube extending through the cross of said T-fitting and received at one end in the aperture in said hopper, said tube having a pair of oppositely-disposed openings therein alternatively registrable with the interior of the stem of said T-fitting and a partition extending diagonally across the interior thereof from the bottom of one opening to the top of the other, a collar secured on said tube and bearing on the top of the cross of said T-fitting, and a handle extending outwardly from said collar.

4. A dispensing machine comprising a power unit having a drive shaft projecting therefrom, a material handling assembly including a pump having a discharge opening and a pump shaft projecting therefrom, a hopper mounted on said pump, and manually-operated valve means connected to said pump at said outlet opening and to said hopper and operative to discharge material from said pump or to return such material from said pump to said hopper, and means detachably mounting said material handling unit on said power unit with said pump shaft in axial alignment with said drive shaft, said shafts having separable, torque-transmitting connecting means thereon, said means detachably mounting said material handling unit on said power unit comprising a sleeve projecting outwardly from said power unit and surrounding said drive shaft, a sleeve projecting outwardly from said pump and surrounding said pump shaft, one of said sleeves being telescopically receivable in the other, and means inter-connecting said sleeves to releasably hold them in predetermined, telescopically associated relationship.

LYSLE J. PULSE.

REFERENCES CITED

The following references are of record in the file of this patent:

UNITED STATES PATENTS

| Number | Name | Date |
| --- | --- | --- |
| Re. 4,882 | Welch | Apr. 23, 1872 |
| 843,935 | Fargo | Feb. 12, 1907 |
| 1,753,278 | Westberg et al. | Apr. 8, 1930 |